UNITED STATES PATENT OFFICE.

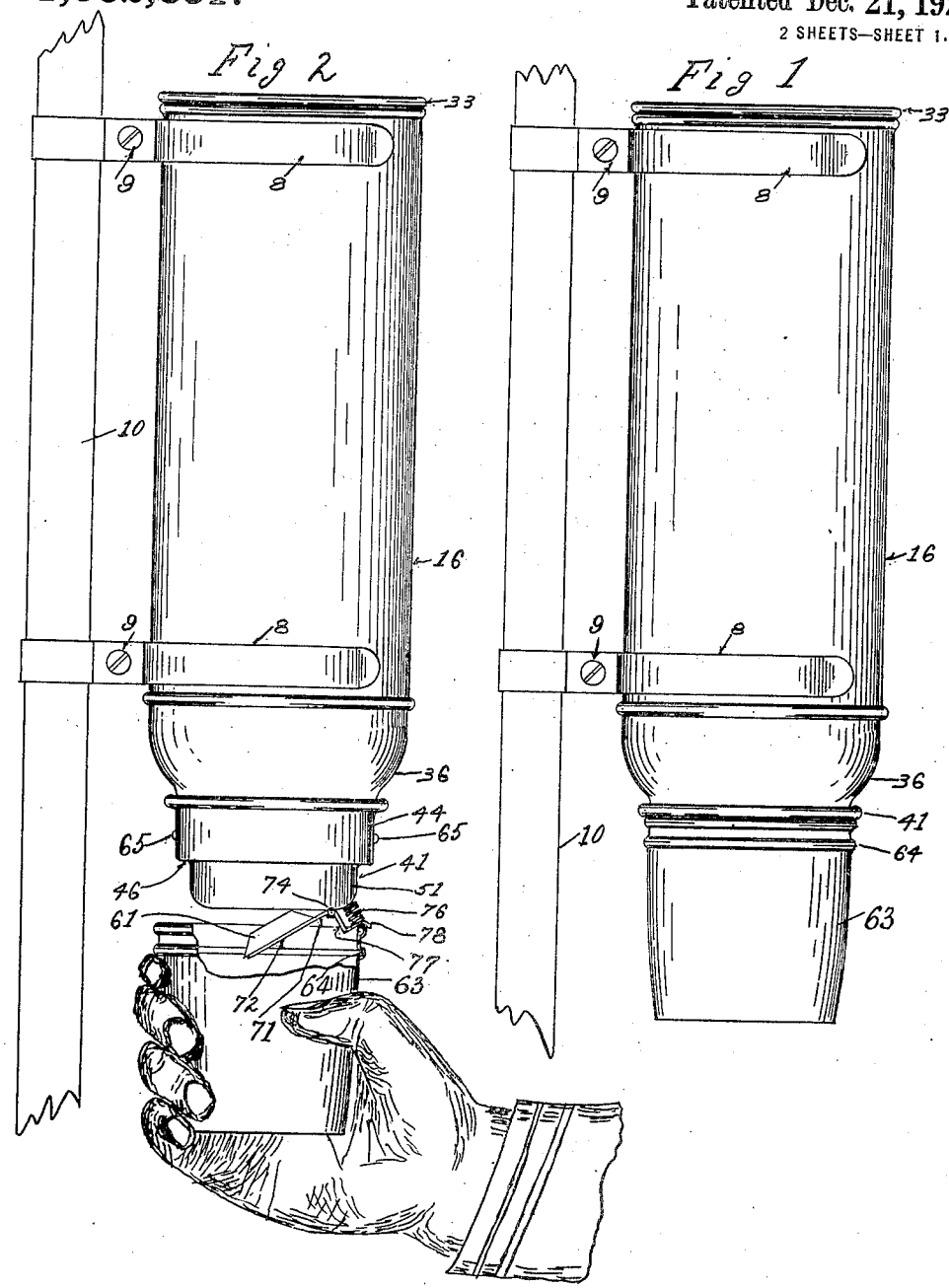

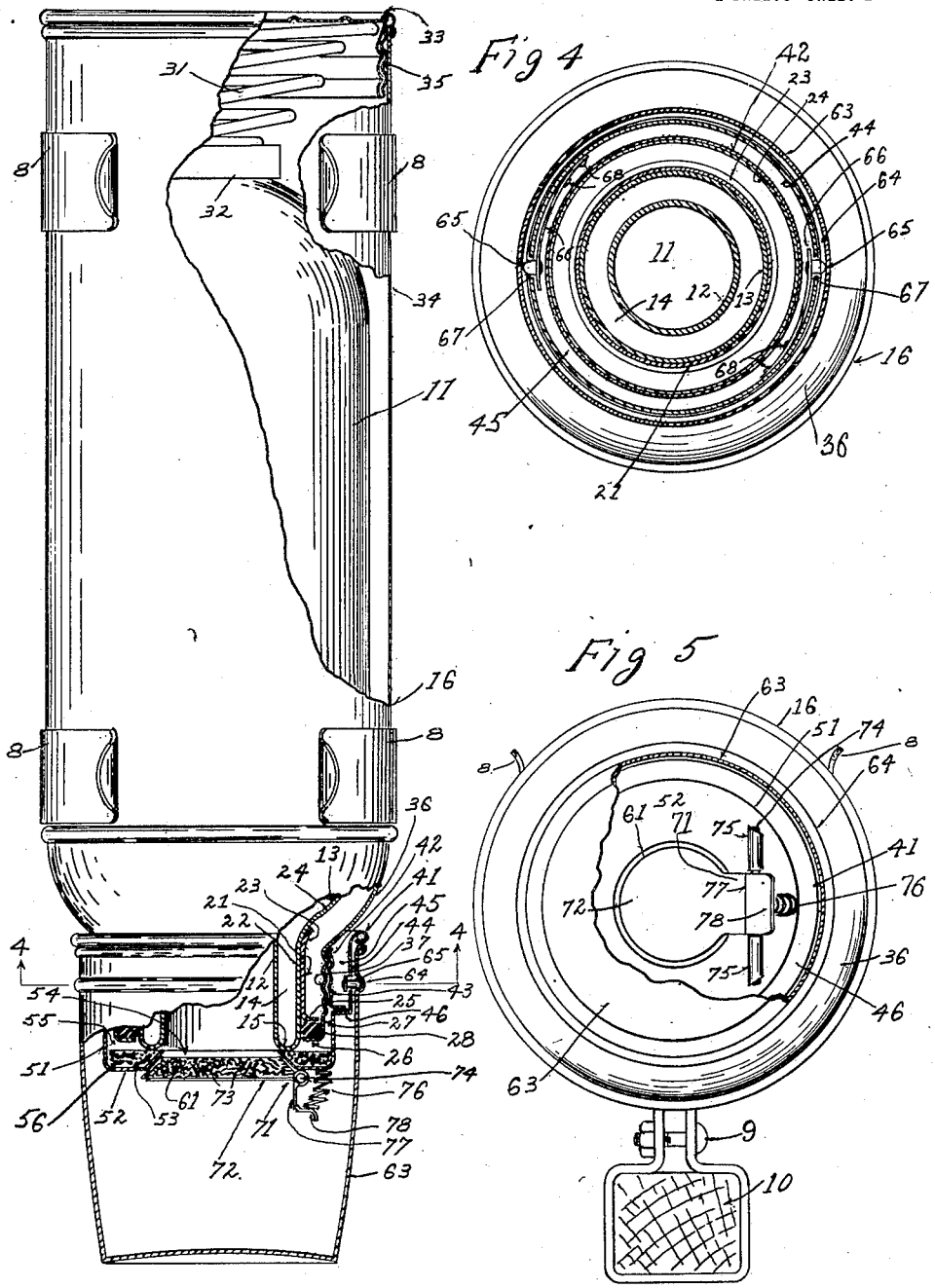

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

VESSEL.

1,362,831.      Specification of Letters Patent.      Patented Dec. 21, 1920.

Application filed February 12, 1918. Serial No. 216,800.

*To all whom it may concern:*

Be it known that I, GEORGE P. ALTENBERG, a citizen of the United States, residing at Cincinnati, in the county of Hamilton and State of Ohio, have invented certain new and useful Improvements in Vessels, of which the following is a specification.

It is the object of my invention to provide a vessel so arranged that the contents thereof may be withdrawn in selected and desired quantities into a suitable cup or container by the employment of only one hand, and is especially useful for employment in connection with heat-insulated vessels on aeroplanes on which the number of parts to be manually operated by the driver are quite numerous and the hands of the operator have quite a number of duties to perform, so that it is extremely undesirable and in fact dangerous for the operator to release both hands simultaneously from the operating parts of the machine.

The flights of aeroplanes are very frequently quite extensive and reach high altitudes, and it has been found desirable that the operator, during his flight, use a liquid refreshment or stimulant, for instance, hot tea or hot coffee. Great difficulty has been experienced by aviators in partaking of liquid refreshment or stimulant, for the reason that both the hands were needed heretofore for dispensing or withdrawing the beverage.

I have therefore provided a vessel shown as of the vacuum insulated type, in which the liquid refreshment or stimulant, for instance, hot coffee or hot tea, may be maintained in heated condition for a great length of time, for instance an entire day, and which is secured in inverted position to the aeroplane, so that the mouth of the vessel extends downwardly, the vessel being provided with a cup which is releasable from the vessel by one hand, and the vessel being provided with an automatic closure normally held closed for maintaining the liquid in the vessel, but arranged to be opened by pressure thereon by the cup while holding the cup under the mouth for receiving liquid therefrom, the mouth of the vessel and closure being normally covered by the cup.

It is a further object of my invention to provide a vessel with a detachable automatic closing means; further, to provide a cup arranged to be received over the detachable closing means; further, to provide the detachable closing means and cup with complemental releasable securing means; further, to provide a vessel and a cup therefor arranged to be received over the mouth of said vessel, the said cup and vessel being provided with complemental securing means arranged to coact for securing the cup in place by manual axial movement of the cup relatively to the vessel, and, further, so arranged that the cup is secured to the vessel by such axial movement in substantially all radial positions of the cup with relation to the vessel; further, to provide an inverted vessel, for instance of the heat-insulated type, with automatic closing means for retaining the contents of the ----sel and arranged to open by pressure of the cup against the closing means toward the vessel, whereby the vessel is opened and liquid therein withdrawn by a movement of the cup toward the vessel by one hand of the operator: and, further, to ---------- vessels of the character mentioned with interchangeable closing means arranged to resiliently close and to be opened by action thereon by the cup.

The invention will be further readily understood from the following description and claims, and from the drawings, in which latter:

Figure 1 is a front elevation of an exemplification of my improved device, showing a vacuum insulated bottle secured in inverted position to an aeroplane, the latter partly broken away, and the vacuum insulated bottle having its cup applied thereto.

Fig. 2 is a similar view showing the cup pressed toward the bottle by means of one hand for opening the mouth of the bottle in order to withdraw contents thereof into the cup.

Fig. 3 is a side elevation of my improved device, partly in axial section and partly broken away for better illustration of parts, the bottle being shown inverted and having the cup thereon with the stopper closed.

Fig. 4 is a horizontal section of my improved device, taken on the line 4—4 of Fig. 3; and, Fig. 5 is an end view of my improved device, taken from the mouth-end, and showing the cup partly broken away to expose the closure for the vessel.

The vessel is held in inverted position on the aeroplane, as by being received between spring clips 8, secured by screw and nut connections 9 about a stanchion 10 of the aeroplane.

The vessel exemplified is a vacuum insulated bottle having an inner vessel 11 of frangible material, for instance glass, comprising an inner wall 12, an outer wall 13, said walls having a vacuum-insulated space 14 between them, and being connected at their mouths by a cross-seal 15, the inner vessel having a protecting casing 16 thereabout.

The protecting casing is preferably of sheet-metal. The inner vessel is preferably releasably contained in the casing. This may be accomplished in suitable manner, for instance, by providing a thimble 21 received about the neck 22 of the inner vessel. The thimble is provided with a flaring portion 23 resting upon the breast 24 of the inner vessel. The outer end of the thimble is provided with an outwardly laterally bent flange 25 received under an inwardly laterally bent flange 26 of the neck 27 of the casing. A cushion-ring 28, instanced as a rubber ring, is received in the space between the neck of the inner vessel and the neck of the casing, which form side walls for said cushion, said cushion being preferably slightly laterally compressed in said space between said walls for preventing leaking or seeping of moisture between the inner vessel and the outer vessel. The cushion-ring is received between the flanges 25 and 26 and is preferably compressed between said flanges.

There is a cushion between the base of the inner vessel and the base of the casing, which is shown as consisting of a spring 31 having a pad 32 thereon which contacts the base of the inner vessel, the spring being located in the base 33 of the casing, which is threaded to the outer end of the body 34 of the casing, as by a screw connection 35 between the same. The breast 24 of the inner vessel is received within the breast 36 of the casing. The neck of the casing is preferably threaded, as shown at 37.

A closure-cap 41 is provided. This closure-cap is exemplified as releasably connected with the casing, exemplified by a ring 42 of the closure-cap provided with screw-threads 43 coacting with the screw-threads of the neck of the casing. The cap may comprise a canopy 44 spaced by a space 45 from the ring, the ring and cap being an integral structure connected by a web 46. The canopy is shown received about the outer portion of the breast 36 of the casing.

The cap, in the present exemplification, is provided with closing means for the vessel. Thus the cap is provided with a wall 51, from which a laterally inwardly extending flange 52 extends, the inner portion 53 of the latter extending reversely to the wall 51 and inwardly toward the axis of the vessel for forming a mouth 54. The wall of this mouth is preferably frusto-conical, with its narrower portion extending inwardly of the inner vessel, and preferably forms an extension of the mouth of the inner vessel. The walls 51 and 53 and the flange 52 form an inner annular recess 55 in which an inner cushion member 56 is located. This inner cushion member may consist of a ring of compressible material, such as cork or rubber, and is instanced as cork. The wall 51, flange 52, the wall 53, and the inner cushion member are exemplified as annular.

The cap is threaded over the threaded neck of the vessel, the cushion member 56 being compressed against the mouth of the inner vessel, resisted by the cushion 31, 32, at the base of the inner vessel for forming a firm closure.

The closing means for the mouth is exemplified as a stopper 61 which coacts with the wall 53. The inner cushion member 56 which coacts with the mouth of the inner frangible vessel and the stopper 61 which coacts with the wall 53, are at opposite sides of said wall 53 when the stopper is closed. The stopper is exemplified as of frusto-conical shape to fit the frusto-conical wall 53 for aiding in the ready seating of said stopper and its ready release, for the purpose hereinafter explained.

The stopper is provided with means for automatically closing the same, and is so constructed as to be released by coaction therewith by a cup held in the hands of the user for receiving the contents of the vessel.

A cup is exemplified at 63, and is arranged to be releasably secured to the vessel by a simple movement of the hand of the operator. This movement is preferably an axial movement of the cup without turning the same, regardless of the axial position of the cup in the hand, the complemental fastening means being exemplified as an annular groove 64 in the cup near its mouth and pins 65 in the cap. The pins are exemplified as on flat springs 66 located in the annular space 45 and projecting through openings 67 in the canopy of the cap, the other ends of the spring being fastened to said canopy as by rivets 68.

The stopper 61 is shown on a lever 71, exemplified as comprising a plate 72 to which the stopper is secured, as by prongs 73 extending from the plate into the stopper. The lever is pivoted to the cap on a pin 74 having bearing in bearings 75 on the cap, a spring 76 normally urging the stopper into closed position. The lever is provided with a projection 77, which has a recess 78 for receiving the edge of the cup. The spring 76 is secured between the cap and the projection.

The cap and vessel are provided with coacting securing means, so that the cap may be used in connection with a plurality of bottles, these coacting securing means being shown as threaded connections, although other connections for the purpose may be employed.

Having thus fully described my invention, what I claim as new and desire to secure by Letters Patent, is:

1. In combination, a vessel comprising a mouth, a closure for said mouth, means for maintaining said closure at said mouth, said closure movable with relation to said mouth for opening and closing said mouth, a cup, and complemental releasable securing means between said cup and said vessel for holding said cup over said mouth with said movable closure within said cup, and said closure provided with means arranged to be manipulated by said cup while in receiving position under said mouth for opening said closure and receiving flow from said mouth.

2. The combination of a vessel comprising an inner vessel and a casing therefor, said casing comprising a neck, a cap received about said neck, said cap and neck provided with complemental releasable securing means, a closure for said vessel on said cap, and a cup, said cup and cap provided with complemental releasable securing means.

3. In combination, a vessel comprising a casing having a neck-portion, a ring received about said neck-portion, complemental securing means between said ring and casing, a cup, complemental releasable securing means between said cup and ring, and a closure for said vessel on said ring within said cup.

4. In combination, a vessel comprising a neck-portion and a mouth, a cap received over said neck-portion, said neck-portion and cap provided with complemental securing means, said cap provided with a laterally inwardly extending portion surrounding said mouth and coacting with said mouth and in turn forming a mouth for said vessel, and a closure engaging said last-named mouth.

5. In combination, a vessel having a mouth, said vessel comprising a neck-portion, a cap received over said neck-portion, said cap and neck-portion having complemental releasable securing means, said cap having a laterally inwardly extending annular portion coacting with said mouth for forming an extension of said mouth, a closure for said mouth, a cup, and complemental releasable securing means between said cup and cap whereby said cup is releasably secured to said cap to cover said mouth and closure.

6. The combination of a vessel arranged to be held in inverted position, said vessel comprising a casing, closing means for the mouth of said vessel mounted on said casing, means acting to releasably hold said closing means in closed position, and a part having a cup-arresting portion arranged to be contacted by a cup held in receiving position under said mouth acting on said closure for opening the same, whereby to withdraw contents of said vessel into said cup so held.

7. The combination of a vessel arranged to be held in inverted position with the mouth of said vessel projected downwardly, a closure for said mouth pivoted to said vessel, said closure provided with a downwardly and laterally extending projection having a cup-contacting face thereon, said cup-contacting face formed with a cup-arresting portion, and a spring between said vessel and said part for resiliently urging said closure to close said mouth, and arranged whereby a cup held in receiving position under said mouth is arranged to press said part for opening said closure.

8. The combination of a vessel arranged to be held in inverted position with the mouth of said vessel projected downwardly, a closure for said mouth, means for releasably holding said closure in closed position, cup-arresting means therefor whereby to open said closure by pressure of a cup, a cup received over said closure, and complemental releasable securing means for releasably securing said cup to said vessel, and constructed and arranged whereby said cup is released from said securing means and said releasing means are pressed by said cup by uninterrupted manipulation of said cup by one hand of the user.

9. The combination of a vessel comprising a casing having a screw-threaded neck and a breast, a screw-ring coacting with said screw-threaded neck, said ring provided with a canopy extending toward said breast and with a cap-portion extending reversely to said canopy about the mouth of said vessel, a closure on said cap for said mouth, said closure provided with cup-contact means for opening the same, and a cup received over said cap and said closure, said cup and cap provided with complemental securing means.

10. The combination of an inner vessel having a mouth, a casing for said inner vessel, a cup received over said mouth, and complemental releasable securing means between said cup and said casing comprising a plurality of radially extending resiliently outwardly pressed pins, said cup provided with annularly arranged recessed means coacting with said pins for releasably securing said cup to said casing and permitting releasing of said cup from said casing by axial movement of said cup.

11. The combination of a vessel comprising a casing having a neck and a breast, a ring about said neck, said ring and casing provided with complemental releasable securing means, a canopy extending from said ring toward said breast, said canopy and ring having a space between them, pins extending outwardly through said canopy, spring means in said space pressing said pins outwardly, and a cup provided with annularly arranged recess means complemental to said pins for releasably securing said cup to said canopy.

12. In combination, a vessel comprising a frangible inner vessel having a base and a neck provided with a mouth, a casing therefor having a base and a neck, cushioning means between said bases, a cap received over said neck of said casing and provided with a laterally inwardly extending flange, a cushion between said flange and said mouth of said frangible inner vessel, and complemental securing means between said cap and said casing for pressing said frangible inner vessel between said last-named cushion and said first-named cushioning means.

13. In combination, a vessel comprising a frangible inner vessel having a base and a neck provided with a mouth, a casing therefor having a base and a neck, cushioning means between said bases, a cap received over said neck of said casing and provided with a laterally inwardly extending flange, a cushion between said flange and said mouth of said frangible inner vessel, complemental securing means between said cap and said casing for pressing said frangible inner vessel between said last-named cushion and said first-named cushioning means, a resiliently yielding closure on said cap, and a cup, said closure provided with means for opening said closure by pressure thereon of said cup, and said cup arranged to be received over said closure.

14. In combination, an inner vessel, a casing received thereabout, cushioning means between the base of said inner vessel and the base of said casing whereby the mouth of said inner vessel is urged outwardly of said casing, said inner vessel and said casing provided with neck-portions, a cap received over the neck-portion of said casing, said cap and casing having complemental releasable securing means, said cap having an inwardly laterally extending portion, and a cushion in the latter coacting with said mouth of said inner vessel and arranged whereby said inner vessel is pressed between said last-named cushion and said first-named cushioning means.

15. In combination, an inner vessel, a casing received thereabout, cushioning means between the base of said inner vessel and the base of said casing whereby the mouth of said inner vessel is urged outwardly of said casing, said inner vessel and said casing provided with neck-portions, a cap received over the neck-portion of said casing, said cap and casing having complemental releasable securing means, said cap having an inwardly laterally extending portion, a cushion in the latter coacting with said mouth of said inner vessel and arranged whereby said inner vessel is pressed between said last-named cushion and said first-named cushioning means, and a closure for said vessel on said cap.

16. In combination, an inner vessel, a casing received thereabout, cushioning means between the base of said inner vessel and the base of said casing whereby the mouth of said inner vessel is urged outwardly of said casing, said inner vessel and said casing provided with neck-portions, a cap received over the neck-portion of said casing, said cap and casing having complemental releasable securing means, said cap having an inwardly laterally extending portion, a cushion in the latter coacting with said mouth of said inner vessel and arranged whereby said inner vessel is pressed between said last-named cushion and said first-named cushioning means, a closure for said vessel on said cap, and resilient means between said closure and cap for resiliently holding said closure in closed relation.

17. In combination, an inner vessel, a casing received thereabout, cushioning means between the base of said inner vessel and the base of said casing whereby the mouth of said inner vessel is urged outwardly of said casing, said inner vessel and said casing provided with neck-portions, a cap received over the neck-portion of said casing, said cap and casing having complemental releasable securing means, said cap having an inwardly laterally extending portion, a cushion in the latter coacting with said mouth of said inner vessel and arranged whereby said inner vessel is pressed between said last-named cushion and said first-named cushioning means, a closure for said vessel on said cap, resilient means between said closure and cap for resiliently holding said closure in closed relation, and a cup received about said cap and closure, and said closure provided with a part arranged to be contacted by said cup for counteracting said resilient means and opening said closure, whereby contents of said vessel are withdrawn into said cup when said vessel is in inverted position.

In testimony whereof I have hereunto signed my name in the presence of two subscribing witnesses.

GEORGE P. ALTENBERG.

Witnesses:
I. M. PENCE,
G. S. HAWKE.